United States Patent [19]

Nagashima

[11] Patent Number: 4,544,210
[45] Date of Patent: Oct. 1, 1985

[54] HYDRAULIC BRAKE INERTIA-CONTROLLED PROPORTIONING VALVE

[75] Inventor: Takashi Nagashima, Aichi, Japan

[73] Assignee: Aisin Seiki Kabushiki Kaisha, Kariya, Japan

[21] Appl. No.: 474,126

[22] Filed: Mar. 10, 1983

[30] Foreign Application Priority Data

Mar. 20, 1982 [JP] Japan ................................. 57-45149
Mar. 20, 1982 [JP] Japan ................................. 57-45150
Sep. 29, 1982 [JP] Japan ................................ 57-171777

[51] Int. Cl.$^4$ .............................................. B60T 8/14
[52] U.S. Cl. .................................. 303/6 C; 303/24 F; 303/24 C
[58] Field of Search ................. 303/24 F, 24 C, 24 A, 303/24 R, 6 C; 188/349

[56] References Cited

U.S. PATENT DOCUMENTS

| | | | |
|---|---|---|---|
| 3,825,303 | 7/1974 | Yabuta | 303/6 C |
| 3,944,293 | 3/1976 | Ishigami et al. | 303/24 F |
| 4,133,584 | 1/1979 | Ohta et al. | 303/6 C |
| 4,261,623 | 4/1981 | Mizusawa | 303/24 F |
| 4,284,307 | 8/1981 | Kubata et al. | 303/6 C |

Primary Examiner—George E. A. Halvosa
Assistant Examiner—Alvin Oberley
Attorney, Agent, or Firm—Oblon, Fisher, Spivak, McClelland & Maier

[57] ABSTRACT

A hydraulic brake control assembly for a vehicle having a master cylinder and a brake wheel cylinder including a housing having an inlet port which is in communication with a master cylinder and an outlet port which is in communication with a brake wheel cylinder, a proportioning valve positioned within said housing and which includes a slidable valve piston for effecting proportioning operation, a plunger positioned within the housing and coaxial with the valve piston, a first spring positioned between the valve piston and the plunger for biasing the valve piston in a direction wherein the proportioning valve is positioned in an open position, the housing including a first chamber formed therein in communication with an inlet port and in communication with the outlet port by way of the proportioning valve and a second chamber communication with the inlet port, the valve piston having an effective pressure receiving area which is exposed to the hydraulic fluid within the first chamber so that the valve piston is urged against the first spring, the plunger having an effective pressure receiving area which is exposed to the hydraulic fluid within the second chamber so that the plunger is urged in a direction in which the first spring is compressed and a G-valve positioned between the inlet port and the second chamber within the housing for interrupting fluid communication therebetween in response to a preset deceleration of the vehicle.

8 Claims, 8 Drawing Figures

HYDRAULIC BRAKE INERTIA-CONTROLLED PROPORTIONING VALVE

BACKGROUND OF THE INVENTION

1. Field of the Invention

This invention relates to a hydraulic brake control assembly for vehicles and more particularly to a hydraulic brake inertia-controlled proportioning valve responsive to vehicle deceleration.

2. Description of the Prior Art

Conventionally, various hydraulic brake control assemblies for vehicles have been proposed which include proportioning valve means to thereby reduce the hydraulic pressure in the rear wheel brake cylinder with respect to the hydraulic pressure in the master cylinder after the hydraulic pressure in the master cylinder reaches a predetermined value (deflecting point). The proportioning valve means is well-known and comprises a piston having an enlarged valve portion which is engageable with a resilient seat member and a spring to bias the piston in a direction in which the valve portion is spaced from the seat member. In addition, it is well-known that it is desirable to actuate the proportioning valve means in accordance with vehicle loading, namely it is desirable to shift the deflecting point in accordance with vehicle loading. Therefore, prior hydraulic brake control assemblies further included means for modifying the biasing force of the spring which biases the piston of the proportioning valve means in accordance with the vehicle loading.

The means for modifying the biasing force of the spring comprises a plunger which is slidable by means of the hydraulic pressure in the master cylinder to thereby modify the biasing force of the spring, and an inertia-responsive ball for controlling admission of the hydraulic pressure to the plunger according to vehicle deceleration. In such prior assemblies, however, the pressure receiving area of the plunger is set to be larger than that of the piston and therefore the plunger may be moved so as to increase the biasing force of the spring before reaching the deflecting point, namely before the piston is initially moved. This means that the deflecting point may be undesirably raised especially when the vehicle loading is small and thus desirable control of the hydraulic brake pressure will not be obtained.

In order to obviate the above-noted disadvantage, prior brake control assemblies include a check valve which is positioned between the inertia-responsive ball and the plunger to thereby admit the hydraulic pressure to the plunger only after the hydraulic pressure reaches the predetermined value as disclosed for example in U.S. Pat. No. 3,944,293. In such prior assemblies, however, the construction thereof is complex in nature.

SUMMARY OF THE INVENTION

Therefore, it is an object of the present invention to provide a new and improved hydraulic brake control assembly which obviates the various prior disadvantages mentioned above.

It is another object of the present invention to provide a new and improved hydraulic brake control assembly which is simple in construction.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
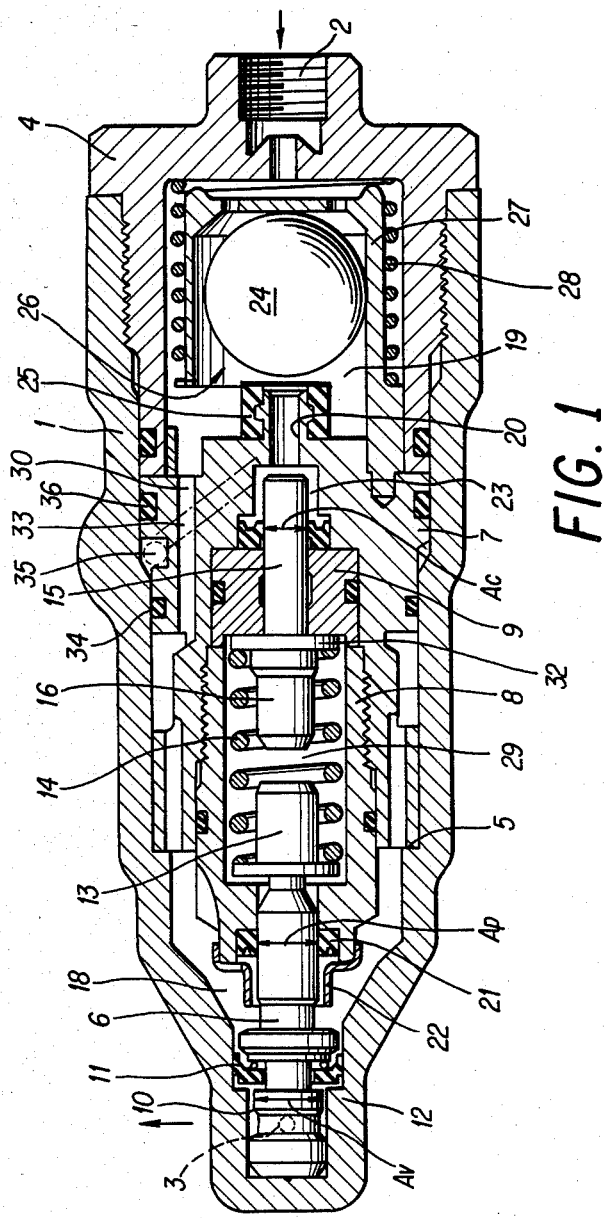
FIG. 1 is a cross-sectional view of a hydraulic brake control assembly in accordance with the present invention.
Figure 2:
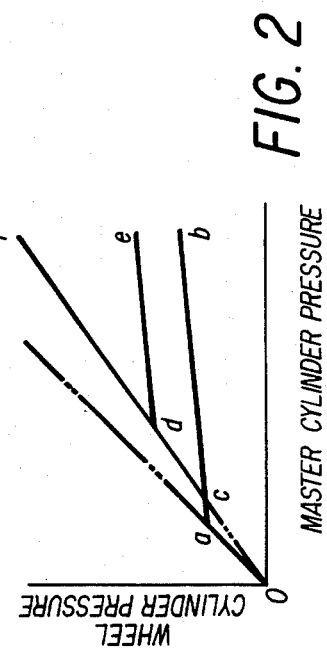
FIG. 2 is a graph showing characteristics of hydraulic brake pressure in accordance with the hydraulic brake control assembly in FIG. 1.

Referring now to FIGS. 1 and 2 illustrating a first embodiment of the present invention, a hydraulic brake control assembly includes a housing 1 and a plug 4 which are secured to each other, the plug 4 having an inlet port 2 which is in fluid communication with a master cylinder (not shown) and the housing 1 having an outlet port 3 which is in fluid communication with a rear wheel brake cylinder (not shown). A bushing 7 is fitted within a stepped inner surface 5 of the housing 1 by means of the plug 4. Sealingly disposed within the bushing 7 are a first guide member 8 and a second guide member 9, the second guide member 9 being fitted and the first guide member 8 being threaded through the inner surface of the bushing 7. A piston 6 has a left portion which is slidably received within the inner surface of the housing 1 and a right portion which is slidably received within the inner surface of the first guide member 8 by means of a seal member 21. Numeral 22 denotes a seal retainer.

The piston 6 has an enlarged valve portion 10 which is engageable with a ring shaped resilient seat 11 to thereby constitute a proportioning valve means 12. The piston 6 is biased to the left by a spring 14 by means of a retainer 13. The other end of the spring 14 is seated against a plunger 15 which has a flange 32 and a leftward projection 16 which in turn faces the retainer 13.

By the above-noted arrangement, first and second chambers 18 and 19 are defined within the housing 1 with the plug 4 and an atmospheric pressure chamber 29 is also defined, the first chamber 18 being in selective fluid communication with the outlet port 3 by means of the proportioning valve means 12 and the second chamber 19 being in fluid communication with the inlet port 2. Both chambers 18 and 19 are connected to each other through a passage 30. The bushing 7 has a passage 20 which leads to a control chamber 23 to which the plunger 15 is exposed. A ball 24 acting as an inertia responsive valve will roll on a bushing 27 positioned within the chamber 19 so as to be brought in contact with a seat 25 and to thereby close the passage 20 so that a so-called G-valve assembly 26 is formed. The bushing 27 is biased to the left by a spring 28 in its illustrated position where the left end of the bushing 27 is brought in contact with the shoulder of the bushing 7 and the left end of the bushing 7 is then brought in pressing contact with the shoulder of the housing 1.

Numerals 34 and 36 denote seal members and numeral 33 denotes an air deflating passage which leads to an outlet port 35.

In the above construction, the effective sealing diameters are set as follows:

$$A_v > A_p > A_c$$

where $A_v$ is the effective sealing diameter of the enlarged valve portion 10, namely the proportioning valve means 12; $A_p$ is the sealing diameter of the piston 6; and $A_c$ is the sealing diameter of the plunger 15.

When the brake pedal is depressed, the hydraulic brake pressure which is transmitted to the inlet port 2 from the master cylinder is then transmitted to the rear wheel brake cylinder by means of chamber 19, passage 30, chamber 18, proportioning valve means 12 and outlet port 3.

More particularly, when the vehicle load is small or minimal, brake operation is as follows:

The hydraulic brake pressure at the inlet port 2 is transmitted to the control chamber 23 by means of the G-valve assembly 26 which is now in its open position and is also transmitted to the chamber 18 by means of the passage 30. Thus, the plunger 15 is urged to the left by means of the hydraulic pressure within the chamber 23 while the piston 6 is urged to the right by means of the hydraulic pressure within the chamber 18. As long as the hydraulic pressure is low, the piston 6 and the plunger 15 are maintained in their illustrated and original positions by means of the spring 14 and, therefore, the hydraulic brake pressure is transmitted to the rear wheel brake cylinder by means of the outlet port 3. When the hydraulic brake pressure increases, the piston 6 is initially moved to the right against the spring 14 by means of the hydraulic pressure which acts on the effective sealing diameter $A_p$ of the piston 6 since the effective sealing diameter $A_p$ is larger than the effective sealing diameter $A_c$ of the plunger 15. When the hydraulic brake pressure becomes a predetermined value, the piston 6 is sufficiently moved to the right to thereby cause the proportioning valve means 12 to operate such that the enlarged valve portion 10 is sealingly engaged with the seat 11. Thus, the hydraulic brake pressure in the rear wheel brake cylinder is reduced with respect to the hydraulic pressure in the master cylinder. The successively increasing pressure in the master cylinder is applied to the annular portion of the enlarged valve portion 10 and the piston 6 is moved to the left thereby reestablishing fluid communication between the rear wheel brake cylinder and the master cylinder. Thereafter, the above-mentioned operation will be repeated and, therefore, the brake pressure will be controlled as shown by line o-a-b in FIG. 2 in response to the ratio of the diameters $A_v$ and $A_p$.

During the above-noted operation, the plunger 15 will not move due to the above arrangements of $A_p > A_c$. The point a in FIG. 2 depends on the set load of the spring 14 and the diameter $A_p$ since the piston 6 is urged to the left by means of only the spring 14 against the hydraulic pressure which acts on the diameter $A_p$. During the aforementioned brake operation, the ball 24 will be brought in contact with the seat 25 when the preset deceleration will be achieved. Because the vehicle load is small or minimal, the ball 24 will now be brought in contact with the seat 25 at the stage where the brake pressure is lower than that at point c in FIG. 2 and, therefore, the brake pressure will be controlled along the line o-a-c in FIG. 2 and will be independent of the operation of the ball 24. In other words, when the vehicle load is small or minimal, the piston 6 is repeatedly operated even after the ball 24 is brought in contact with the seat 25 so that the brake pressure will be controlled along the line o-a-b in FIG. 2.

When the vehicle load is moderate, the preset deceleration, which is sufficient to cause the ball 24 to be in contact with the seat 25, will not be achieved at the stage where the brake pressure is lower than that at point c in FIG. 2. Until reaching the point c in FIG. 2, the brake pressure will be controlled along the line o-a-c in FIG. 2 by means of the spring 14 and the diameters $A_p$ and $A_v$. When the hydraulic pressure at the inlet port 2 reaches the point c, the plunger 15 begins to move to the left by means of the hydraulic pressure within the chamber 23 and then the flange 32 is spaced from the second guide member 9. Thus, the following formula may be controlling:

$$P_w \cdot A_{v1} = P_m(A_{v1} - A_{p1}) + P_m \cdot A_{c1}$$

where $P_m$ is the brake master cylinder pressure, $P_w$ is the rear brake wheel cylinder pressure, $A_{v1}$ is the pressure receiving area of the diameter $A_v$, $A_{p1}$ is the pressure receiving area of the diameter $A_p$ and $A_{c1}$ is the pressure receiving area of the diameter $A_c$.

Therefore, $$P_w = \left(1.0 + \frac{A_{c1} - A_{p1}}{A_{v1}}\right) \cdot P_m \quad (1)$$

Since $A_c < A_p$, $$\left(1 + \frac{A_{c1} - A_{p1}}{A_{v1}}\right) < 1 \quad (2)$$

Accordingly, the brake pressure will be thereafter controlled along the line c-d in FIG. 2 where the angle which is defined by the line c-d to the horizontal axis is less than the 45° angle which is defined by the line o-a with respect to the horizontal axis.

When the hydraulic pressure reaches the point d in FIG. 2, the preset deceleration is achieved and then the ball 24 is brought in contact with the seat 25. Thus, the brake operation which is defined by formula (1) will stop and the brake pressure will be thereafter controlled along the line d-e in the same manner as that on and after the point a when the vehicle load is small or minimal.

When the vehicle load is large, the deceleration which is achieved at the brake pressure of point d is not sufficient to cause the ball 24 to be brought in contact with the seat 25. Therefore, the brake pressure will be controlled along the line d-f in accordance with formula (1). Even after the ball 24 is brought in contact with the seat 25 during these brake operations, the hydraulic pressure within chamber 23 will still increase because the seat 25 may be strained by means of the seating pressure by the ball 24 to thereby be moved until it is brought in contact with the bushing 7 which defines the passage 20 and also because the O-ring seal member 34 for the outlet port 35 of the air deflating passage 33 may be strained. As a result, the brake pressure will be still controlled in accordance with formula (1) and along the line d-f within the practical range thereof. During these brake operations, the projection 16 of the plunger 15 may be brought in contact with the retainer 13. Insofar as the hydraulic pressures within chambers 23 and 18 increase respectively at the same rate (namely 1:1) after the above contact, the brake pressure will be controlled in accordance with the above-noted formula (1).

The above-mentioned increase in the hydraulic pressure within the chamber 23 due to the strains of the seat 25 and the seal member 34 may occur also at the point d in FIG. 2. However, the influence of the above increase in the hydraulic pressure will be small since it is at low pressure stage. The point d may be shifted. As will be clear hereinbefore, the characteristic line has no deflecting point when the vehicle load is maximum. The angle which is defined by the characteristic line and the horizontal axis is smaller than that defined by the line of 45° angle which is shown by two-dotted chain line in FIG. 2. Therefore, the hydraulic brake control assembly in FIG. 1 is applicable to vehicles where the effective load is relatively small.

Figure 3:
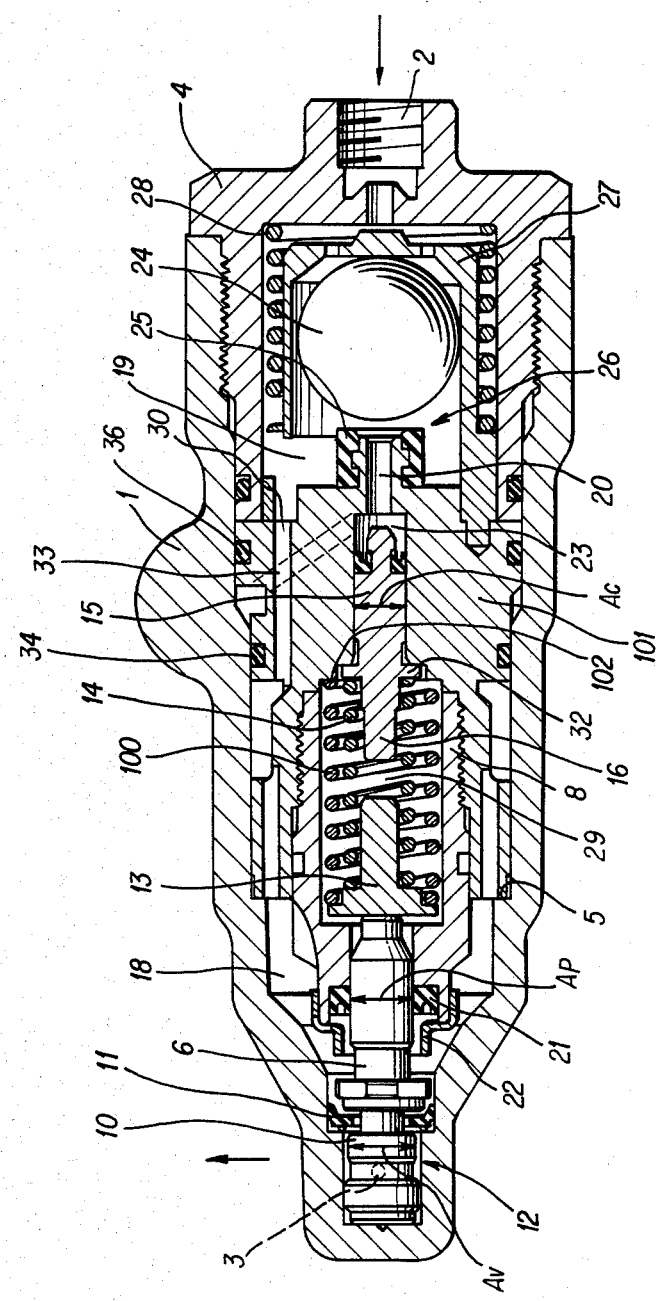
FIG. 3 is a view similar to FIG. 1, but showing a modification of the present invention.
Figure 4:
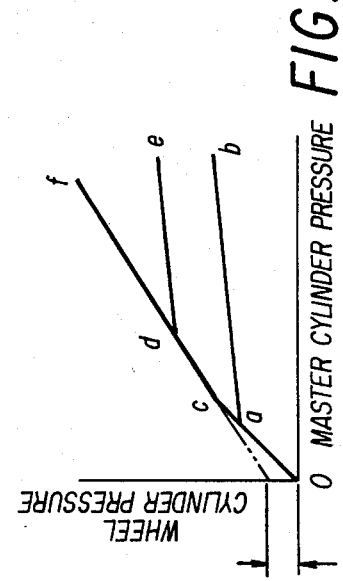
FIG. 4 is a graph similar to FIG. 2, but showing characteristics in accordance with the assembly in FIG. 3.

Turning to FIGS. 3 and 4 showing a modification of the present invention, the parts which are the same as those in the previous embodiment are designated by the same reference numerals. In this modification, a further spring 100 is positioned between the retainer 13 and shoulder 102 of the bushing 101 and the plunger 15 is directly and slidably received within the bushing 101.

In operation, when the vehicle load is minimal or small, the brake pressure is controlled along the line o-a-b in FIG. 4, in substantially the same way as that of the previous embodiment, wherein the point a is deflecting point which means the start of operation of the proportioning valve means 12. The ball 24 may be set so as to be brought in contact with the seat 25 before reaching the deflecting point a in FIG. 4 and therefore the hydraulic pressure within the chamber 23 will not increase sufficiently to cause the plunger 15 to move. As long as the vehicle load is small, the plunger 15 remains in its illustrated position by means of the spring 14 and thus the piston 6 is biased by the prescribed biasing force of two springs 14 and 100.

When the vehicle load is medium or midlevel, the preset deceleration is not achieved before reaching, the deflecting point a. Thus, the hydraulic pressure which is communicated to the chamber 23 sufficiently increases to cause the plunger 15 to move to the left, before reaching the deflecting point a. The spring 14 is now compressed so as to increase the biasing force thereof which biases the piston 6 to the left. Accordingly, until reaching the point c which is higher than the deflecting point a, the proportioning means 12 remains in its illustrated position by means of both springs 14 and 100. When the hydraulic pressure reaches the point c, the piston 6 is moved to the right against springs 14 and 100 since the effective diameter $A_p$ of the piston 6 is larger than the effective diameter $A_c$ of the plunger 15 so that the proportioning valve 12 begins to operate. Thereafter, the hydraulic pressure is controlled along the line c-d in FIG. 4.

During the aforementioned operation along the line c-d, the following formula may be controlling:

$$P_w \cdot A_{v1} = P_m(A_{v1} - A_{p1}) + P_m \cdot A_{c1} = F_2$$

where $P_m$ is the brake master cylinder pressure, $P_w$ is the rear brake wheel cylinder pressure, $A_{v1}$ is the pressure receiving area of the diameter $A_v$, $A_{p1}$ is the pressure receiving area of the diameter $A_p$, $A_{c1}$ is the pressure receiving area of the diameter $A_c$ and $F_2$ represents the load or biasing force of the spring 100.

Therefore, $$P_w = \left(1 + \frac{A_{c1} - A_{p1}}{A_{v1}}\right) P_m + \frac{P_2}{A_{v1}} \quad (3)$$

Since $A_c < A_p$, $$\left(1 + \frac{A_{c1} - A_{p1}}{A_{v1}}\right) < 1 \quad (4)$$

Accordingly, the brake pressure will be controlled along the line c-d in FIG. 4 where the angle which is defined by the line c-d to the horizontal axis is smaller than the 45° angle which is defined by the line o-c with respect to the horizontal axis.

When the vehicle load is at a maximum or relatively large, the preset deceleration will not be achieved even when the hydraulic pressure reaches the point d in FIG. 4. Therefore, the ball 24 still remains in its illustrated open position. The brake pressure will be controlled along the extension of the line c-d in FIG. 4 even after the brake pressure exceeds the point d. The plunger 15 is now brought in contact with the retainer 13 by means of the increased hydraulic pressure within the chamber 23. After the above contact, the above formula (3) is still satisfied, and the brake pressure will be controlled along line d-f in FIG. 4. During these operations, the ball 24 may be brought in contact with the seat 25, however, the brake pressure will still be controlled in accordance with the aforementioned formula (3) and along the line d-f in FIG. 4 within the practical range thereof because the hydraulic pressure within the chamber 23 is increased due to the strains on the seat 25 and the seal member 34, as is true of that of the previous embodiment.

Turning to FIGS. 5 to 8 showing a further modification of the present invention, in this modification, tandem brake master cylinder 110 is clearly illustrated, and is both hydraulically connected to front wheel cylinders 111 via conduit 112 on the one hand and hydraulically connected to the inlet port 2 via conduit 113 on the other hand. The outlet port 3 of the hydraulic brake control assembly is hydraulically connected to rear wheel cylinders 114 via conduit 115.

Figure 6:
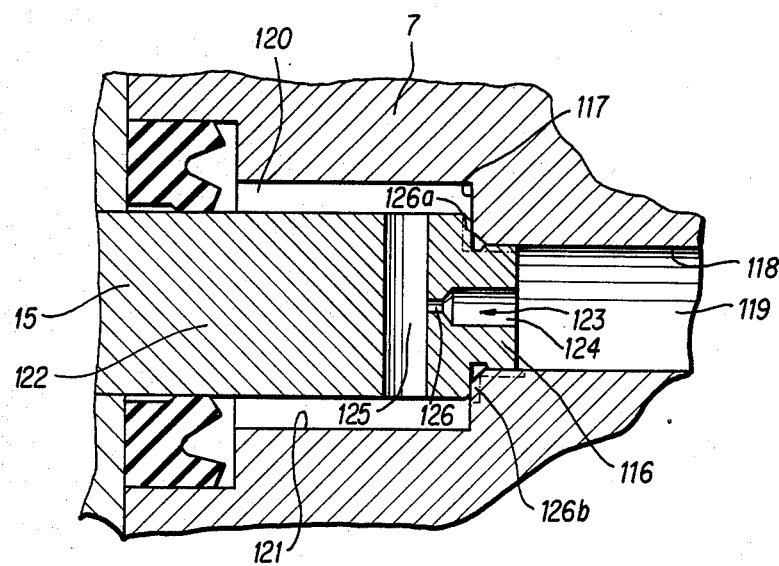
FIG. 6 is an enlarged sectional view showing a normal or nonoperational condition of a part of FIG. 5.
Figure 7:
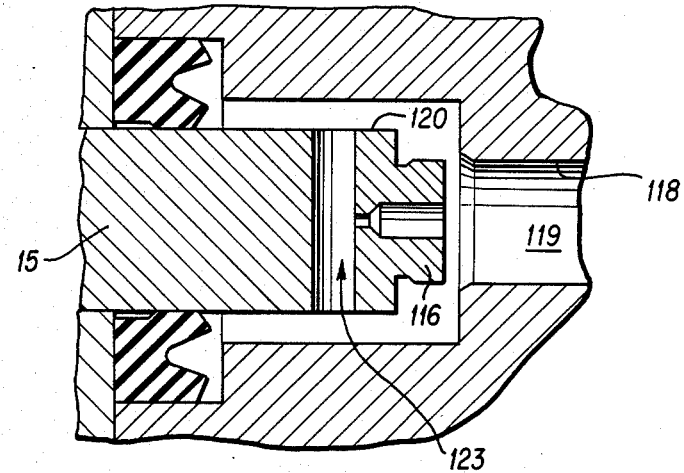
FIG. 7 is a view similar to FIG. 6, but showing the operating condition thereof.

The plunger 15 has at the right end thereof a stepped small, diameter portion 116 and the bushing 7 has a stepped inner bore 117 the configuration of which corresponds to that of the small diameter portion 116. Thus, the small diameter portion 116 is normally received within small bore 118 of the stepped bore 117 for a predetermined distance, as shown in FIG. 6. Under these conditions, the chamber 23 is divided into first and second chambers 119 and 120, the first chamber 119 being defined by the small bore 118 and the second chamber 120 being defined by large bore 121 and large diameter portion 122 of the plunger 15. The chambers 119 and 120 are in fluid communication with each other by means of a passage 123 which comprises passages 124 and 125 and a restriction 126 which are in turn formed in the plunger 15 respectively. When the plunger 15 is moved to the left, both chambers 119 and 120 are brought into direct fluid communication, as shown in FIG. 7, because the small diameter portion 116 of the plunger 115 is spaced from the small bore 118. Numeral 127 denotes passages formed in the bushing 27 and numeral 128 denotes a projection to thereby control the quantity of braking fluid which passes through passages 127.

Figure 5:
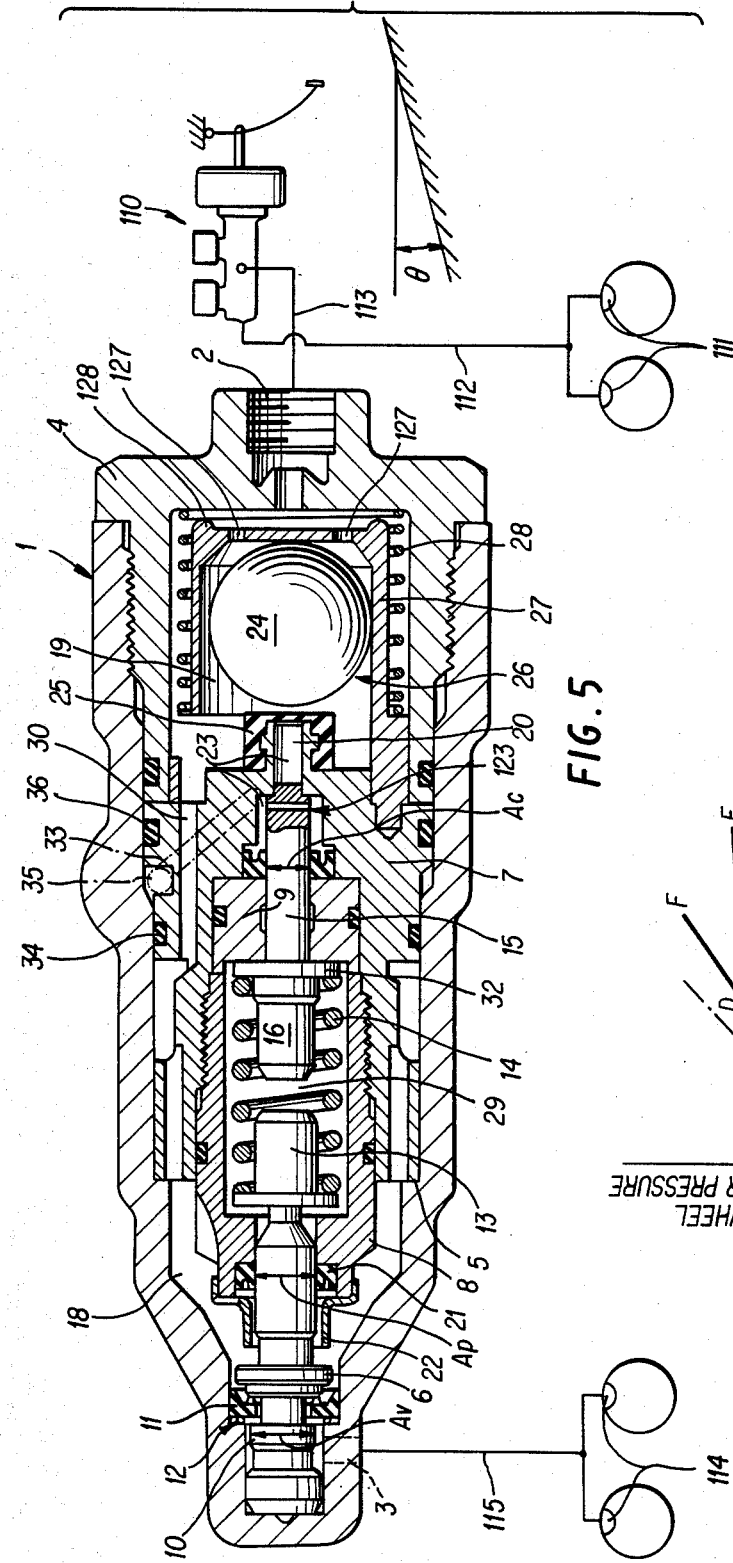
FIG. 5 is a view similar to FIG. 1, but showing a further modification of the present invention.
Figure 8:
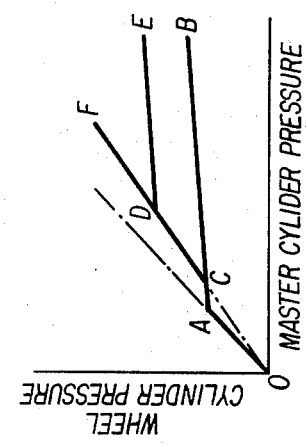
FIG. 8 is a graph similar to FIG. 2, but showing characteristics in accordance with the assembly in FIG. 5.

The above-mentioned hydraulic brake control assembly is installed within vehicle body with a preset angle $\theta$. The operation of the hydraulic brake control assembly as shown in FIG. 5 is substantially the same as that of the assembly in FIG. 1 as shown in FIG. 8.

However, when the brake pedal is suddenly depressed, higher hydraulic pressure will be transmitted to the chamber 119 since operation of the G-valve assembly 26 will be delayed. When the vehicle load is small or minimal, the hydraulic pressure within the chamber 119 is relatively low and the quantity of hydraulic fluid communicated into the chamber 119 is relatively small in comparison with the conditions where the vehicle load is medium or maximum. Furthermore, the small diameter portion 116 of the plunger 15 is received within the bore 118. Therefore, the entire quantity of hydraulic fluid transmitted to the chamber 120 is done so by means of the restriction 126 and the restrictive effect will be sufficiently achieved. Thus, leftward movement of the plunger 15 will be sufficiently controlled and the increase in biasing force of the spring 14 will be effectively controlled. When the vehicle load is medium or maximum, the hydraulic pressure within the chamber 119 is relatively high and the quantity of hydraulic fluid which is communicated into the chamber 119 is relatively large. Therefore, before the small diameter portion 116 of the plunger 15 is spaced from the bore 118, hydraulic fluid is transmitted to the chamber 120 by means of the restriction 126. However, after spacing from the bore 118 occurs, the hydraulic fluid is directly transmitted to the chamber 120 without communication through the restriction 126 to thereby urge the plunger 15 to the left.

Thus, the optimum effect of the restriction 126 will be achieved, leftward movement of the plunger 15 will be suitably controlled and the increase in biasing force of the spring 14 will therefore be effectively controlled. Thus, excellent or stable performance will be achieved in spite of the conditions of vehicle load.

Groove 126a which is formed in the plunger 15 as shown by the single-dotted chain line in FIG. 6 may be substituted for the restriction 126 and groove 126b which is formed in the bushing 7 as shown by double-dotted chain line in FIG. 6 may also be substituted for the restriction 126.

While preferred embodiments of the invention have been described, it will be readily apparent to those skilled in the art that various changes and arrangements can be made to accomplish the objects of the invention without departing from the scope and spirit of the appended claims.

What is claimed as new and is intended to be secured by Letters Patent is:

1. A hydraulic brake control assembly for a vehicle having a master cylinder and a brake wheel cylinder comprising:

a housing having an inlet port which is in communication with said master cylinder and an outlet port which is in communication with said brake wheel cylinder and which includes a stationary member fixed to said housing;

proportioning valve means having a pressure receiving area positioned within said housing and which further comprises a piston for effecting proportioning operation;

a single plunger mounted in sliding contact with said stationary member and coaxial with said piston wherein said plunger is positioned within said housing;

first spring means positioned between said piston and said plunger for biasing said piston in a direction wherein said proportioning valve means is positioned in an open position;

said housing including a first chamber formed therein in communication with said inlet port and in communication with said outlet port by means of said proportioning valve means and a second chamber in communication with said inlet port;

said piston having a pressure receiving area which is exposed to the hydraulic fluid within said first chamber so that said piston is urged against said first spring means;

said plunger having a pressure receiving area which is exposed to the hydraulic fluid within said second chamber so that said plunger is urged in a direction in which said first spring means is compressed; and G-valve means positioned between said inlet port and said second chamber within said housing for interrupting fluid communication therebetween in response to a preset deceleration of said vehicle wherein the pressure receiving area of said Plunger is smaller than the pressure receiving area of said piston and said pressure receiving area of said proportioning valve is greater than said pressure receiving area of said piston.

2. A hydraulic brake control assembly as set forth in claim 1, further comprising second spring means positioned between said valve piston and a stationary part of said housing.

3. A hydraulic brake control assembly for a vehicle having a master cylinder and a brake wheel cylinder comprising:

a housing having an inlet port which is in communication with said master cylinder and an outlet port which is in communication with said brake wheel cylinder;

proportioning valve means positioned within said housing and which further comprises a piston for effecting proportioning operation;

a plunger positioned within said housing and coaxial with said valve piston;

first spring means positioned between said piston and said plunger for biasing said piston in a direction wherein said proportioning valve means is positioned in an open position;

said housing including a first chamber formed therein in communication with said inlet port and in communication with said outlet port by means of said proportioning valve means and a second chamber in communication with said inlet port;

said piston having a pressure receiving area which is exposed to the hydraulic fluid within said first chamber so that said piston is urged against said first spring means;

said plunger having a pressure receiving area which is exposed to the hydraulic fluid within said second chamber so that said plunger is urged in a direction in which said first spring means is compressed;

G-valve means positioned between said inlet port and said second chamber within said housing for interrupting fluid communication therebetween in response to a preset deceleration of said vehicle wherein the pressure receiving area of said plunger is smaller than the pressure receiving area of said piston; and restriction means wherein said housing includes a stationary part having a stepped portion and wherein said plunger further comprises a stepped end portion which is received within said stepped portion of said stationary part of said housing so as to thereby divide said second chamber into third and fourth chambers, said third and fourth chambers normally being in communication with each other by means of said restriction means and being brought in direct communication to each other when said plunger is moved by the fluid pressure within said third and fourth chambers.

4. A hydraulic brake control assembly as set forth in claim 1, wherein the brake control assembly operation is in accordance with the relationship:

$$A_v > A_p > A_c$$

controls wherein $A_v$ is an effective sealing diameter of said proportioning valve means, $A_p$ is an effective sealing diameter of said piston; and $A_c$ is an effective sealing diameter of said plunger.

5. A hydraulic brake control assembly for a vehicle having a master cylinder and a brake wheel cylinder comprising:

a housing having an inlet port which is in communication with said master cylinder and an outlet port which is in communication with said brake wheel cylinder;

proportioning valve means positioned within said housing and which further comprises a piston for effecting proportioning operation;

a plunger positioned within said housing and coaxial with said valve piston;

first spring means positioned between said piston and said plunger for biasing said piston in a direction wherein said proportioning valve means is positioned in an open position;

said housing including a first chamber formed therein in communication with said inlet port and in communication with said outlet port by means of said proportioning valve means and a second chamber in communication with said inlet port;

said piston having a pressure receiving area which is exposed to the hydraulic fluid within said first chamber so that said piston is urged against said first spring means;

said plunger having a pressure receiving area which is exposed to the hydraulic fluid within said second chamber so that said plunger is urged in a direction in which said first spring means is compressed;

G-valve means positioned between said inlet port and said second chamber within said housing for interrupting fluid communication therebetween in response to a preset deceleration of said vehicle wherein the pressure receiving area of said plunger is smaller than the pressure receiving area of said piston;

second spring means positioned between said piston and a stationary part of said housing; and wherein the vehicle includes a rear wheel cylinder and wherein under a moderate vehicle load the relationship:

$$P_w \cdot A_{v1} = P_m(A_{v1} - A_{p1}) + P_m \cdot A_{c1} + F_2$$

controls wherein $A_v$ is an effective sealing diameter of said proportioning valve means, $A_p$ is a sealing diameter of said piston, $A_c$ is a sealing diameter of said plunger; $P_m$ is brake master cylinder pressure, $P_w$ is the rear brake wheel cylinder pressure; $A_{v1}$ is the pressure receiving area of the diameter $A_v$; $A_{p1}$ is the pressure receiving area of diameter $A_p$; $A_{c1}$ is the pressure receiving area of diameter $A_c$ and $F_2$ represents a biasing force of said second spring means.

6. A hydraulic brake control assembly as set forth in claim 3, further comprising passage means formed in said plunger and interconnecting said third and fourth chambers wherein said restriction means further comprises restriction means positioned in said passage means.

7. A hydraulic break control assembly as set forth in claim 3, wherein said restriction means further comprises a groove formed in said plunger.

8. A hydraulic brake control assembly as set forth in claim 3, wherein said restriction means further comprises a groove formed in said stationary part of said housing.

* * * * *

UNITED STATES PATENT AND TRADEMARK OFFICE
CERTIFICATE OF CORRECTION

PATENT NO. : 4,544,210
DATED : OCTOBER 1, 1985
INVENTOR(S) : TAKASHI NAGASHIMA

It is certified that error appears in the above-identified patent and that said Letters Patent is hereby corrected as shown below:

Column 3, line 14, delete "effective".

Column 5, line 50, after "reaching" delete ",".

Column 6, line 2, in the formula, change "$A_{c1} = F_2$" to --$A_{c1} + F_2$--.

Column 6, equation (3), change "$\frac{P_2}{A_{v1}}$" to --$\frac{F_2}{A_{v1}}$--.

Column 8, line 35, change "Plunger" to --plunger--.

Column 8, line 42, delete "valve".

Column 8, line 42, change "a stationary part of said housing" to --said stationary member fixed to said housing--.

Signed and Sealed this

First Day of April 1986

[SEAL]

Attest:

DONALD J. QUIGG

Attesting Officer

Commissioner of Patents and Trademarks